United States Patent
Tsourikov et al.

(10) Patent No.: US 7,962,326 B2
(45) Date of Patent: Jun. 14, 2011

(54) SEMANTIC ANSWERING SYSTEM AND METHOD

(75) Inventors: Valery Tsourikov, Boston, MA (US); Leonid Batchilo, Belmont, MA (US); Igor Sovpel, Minsk (BY); Alexander Korzun, Winchester, MA (US)

(73) Assignee: Invention Machine Corporation, Boston, MA (US)

( * ) Notice: Subject to any disclaimer, the term of this patent is extended or adjusted under 35 U.S.C. 154(b) by 853 days.

(21) Appl. No.: 09/991,079

(22) Filed: Nov. 16, 2001

(65) Prior Publication Data

US 2002/0116176 A1    Aug. 22, 2002

Related U.S. Application Data

(63) Continuation-in-part of application No. 09/815,260, filed on Mar. 22, 2001, now abandoned.

(60) Provisional application No. 60/249,610, filed on Nov. 17, 2000, provisional application No. 60/198,782, filed on Apr. 20, 2000.

(51) Int. Cl.
*G06F 17/27* (2006.01)

(52) U.S. Cl. ............ 704/9; 707/706; 707/707; 707/708; 707/709; 707/728

(58) Field of Classification Search .................. 704/1, 9, 704/10, 275, 270; 707/1–6, 706–709, 728
See application file for complete search history.

(56) References Cited

U.S. PATENT DOCUMENTS

| | | | |
|---|---|---|---|
| 4,688,195 A | 8/1987 | Thompson et al. |
| 4,829,423 A | 5/1989 | Tennant et al. |
| 4,864,502 A | 9/1989 | Kucera et al. |
| 4,868,750 A | 9/1989 | Kucera et al. |
| 4,887,212 A | 12/1989 | Zamora et al. |
| 5,060,155 A | 10/1991 | van Zuilen |
| 5,146,405 A | 9/1992 | Church |
| 5,146,406 A | 9/1992 | Jensen |
| 5,237,502 A | 8/1993 | White et al. |
| 5,331,556 A | 7/1994 | Black, Jr. et al. |

(Continued)

OTHER PUBLICATIONS

Boris Katz, Annotating the World Wide Web using Natural Language, in Proceedings of the 5th RIAO Conference on Computer Assisted Information Searching on the Internet, 1997, teaches a ternary (S-A-O) index generation, for answering questions, pp. 1-7.*

(Continued)

*Primary Examiner* — David R Hudspeth
*Assistant Examiner* — Lamont M Spooner
(74) *Attorney, Agent, or Firm* — Mills & Onello, LLP; David M. Mello (57) ABSTRACT

Answering System enables a user to input a query and responds with answers. Server stores an indexed database of a plurality of S-A-O's (subject-action-object). User generates the query that includes query elements (A-O), (S-A), or (S-X-O), or element (S). The server identifies the database element S, O, or A, or elements (A-O) associated with a respective knowledge base S-A-O that includes the query element(s) in response to the server receiving the query and generates a natural language answer S-A-O that includes the identified and the query elements(s) and transmits the answer to the user apparatus that provides an audio or visual response. The server can conduct WWW searches for documents with S-A-O elements that match query element(s) and adds them to the database, thus treating the WWW as an available knowledge base.

20 Claims, 3 Drawing Sheets

U.S. PATENT DOCUMENTS

| | | | |
|---|---|---|---|
| 5,369,575 A | 11/1994 | Lamberti et al. | |
| 5,377,103 A | 12/1994 | Lamberti et al. | |
| 5,394,509 A | 2/1995 | Winston | |
| 5,404,295 A | 4/1995 | Katz et al. | |
| 5,418,948 A | 5/1995 | Turtle | |
| 5,424,947 A | 6/1995 | Nagao et al. | |
| 5,488,725 A | 1/1996 | Turtle | |
| 5,519,608 A | 5/1996 | Kupie | |
| 5,559,940 A | 9/1996 | Hutson | |
| 5,614,899 A | 3/1997 | Tokuda et al. | |
| 5,630,121 A | 5/1997 | Braden-Harder et al. | |
| 5,634,051 A | 5/1997 | Thompson | |
| 5,642,502 A | 6/1997 | Driscoll | |
| 5,694,592 A | 12/1997 | Driscoll | |
| 5,696,916 A | 12/1997 | Yamazaki et al. | |
| 5,696,962 A | 12/1997 | Kupie | |
| 5,724,571 A | 3/1998 | Woods | |
| 5,748,974 A * | 5/1998 | Johnson | 704/9 |
| 5,761,497 A | 6/1998 | Holt et al. | |
| 5,774,833 A * | 6/1998 | Newman | 704/9 |
| 5,794,050 A | 8/1998 | Dahlgen et al. | |
| 5,799,268 A | 8/1998 | Boguraev | |
| 5,802,493 A | 9/1998 | Sheflott et al. | |
| 5,802,504 A | 9/1998 | Suda et al. | |
| 5,844,798 A | 12/1998 | Uramoto | |
| 5,855,002 A | 12/1998 | Armstrong | |
| 5,873,056 A | 2/1999 | Liddy et al. | |
| 5,873,076 A | 2/1999 | Barr et al. | |
| 5,878,385 A | 3/1999 | Bralich et al. | |
| 5,884,302 A | 3/1999 | Ho | |
| 5,893,104 A | 4/1999 | Srinivasan et al. | |
| 5,895,464 A | 4/1999 | Bhandari et al. | |
| 5,933,822 A | 8/1999 | Braden-Harder et al. | |
| 5,963,940 A | 10/1999 | Liddy et al. | |
| 5,966,686 A | 10/1999 | Heidorn et al. | |
| 5,995,922 A | 11/1999 | Penterouodakis et al. | |
| 6,026,388 A | 2/2000 | Liddy et al. | |
| 6,038,560 A | 3/2000 | Wical | |
| 6,076,051 A | 6/2000 | Messerly et al. | |
| 6,101,492 A | 8/2000 | Jacquemin et al. | |
| 6,167,370 A * | 12/2000 | Tsourikov et al. | 704/9 |
| 6,173,279 B1 * | 1/2001 | Levin et al. | 707/5 |
| 6,246,977 B1 | 6/2001 | Messerly et al. | |
| 6,263,335 B1 * | 7/2001 | Paik et al. | 707/5 |
| 6,269,356 B1 * | 7/2001 | Hatton | 706/55 |
| 6,393,428 B1 * | 5/2002 | Miller et al. | 707/102 |
| 6,442,566 B1 | 8/2002 | Atman et al. | |
| 6,609,091 B1 * | 8/2003 | Budzinski | 704/9 |
| 6,618,715 B1 * | 9/2003 | Johnson et al. | 706/47 |
| 6,901,399 B1 * | 5/2005 | Corston et al. | 707/6 |
| 7,120,574 B2 * | 10/2006 | Troyanova et al. | 704/9 |
| 2001/0039490 A1 * | 11/2001 | Verbitsky et al. | 704/9 |
| 2001/0049688 A1 | 12/2001 | Fratkina et al. | |
| 2005/0055385 A1 | 3/2005 | Sinha et al. | |
| 2006/0167931 A1 | 7/2006 | Bobick et al. | |
| 2006/0242195 A1 | 10/2006 | Bove et al. | |
| 2007/0006177 A1 | 1/2007 | Aiber et al. | |
| 2007/0050393 A1 | 3/2007 | Vogel et al. | |

OTHER PUBLICATIONS

Katz et al., Integrating Web Resources and Lexicons into a Natural Language Query System, 1999, IEEE, 1999, V.2, pp. 255-261.*

* cited by examiner

SEMANTIC ANSWERING SYSTEM AND METHOD

RELATED APPLICATIONS

This is a continuation-in-part application of U.S. patent application Ser. No. 09/815,260 filed Mar. 22, 2001 now abandoned entitled NATURAL LANGUAGE PROCESSING AND QUERY DRIVEN INFORMATION RETRIEVAL, which is a continuing application of U.S. Provisional Application Ser. No. 60/198,782 filed Apr. 20, 2000. This is also a continuation-in-part of U.S. Provisional Patent Application Ser. No. 60/249,610 filed Nov. 17, 2000. Benefits of priorities to all related applications are claimed.

BACKGROUND

The present invention relates to Query and Response information retrieval systems and, more particularly, to such systems capable of receiving a user entered question, processing the data representing the question, searching local and/or web based databases for information relevant to an answer to user's query, and conveying such answer information to the user.

Systems of this general type are known that enable a user to access a preprocessed database of predetermined standard answers to a predetermined set of user queries. The standard system responds to a user-entered query by processing the query to determine one or a combination of key words. The system includes a look-up table to determine which predetermined, stored standard answer or answers have the key word or combination of key words may be responsive to the query. The system activates a link to the predetermined, stored answer (sentence) that includes the matched key word(s) between the user query and the look-up table.

Such known systems are quite limited in the scope or subject matter of the queries that the system can properly process. For example, if user query comprises words that lack all the key words pre-stored in the look-up table, then the system cannot respond with any stored answer or it may respond with an incorrect prestored answer. Also, the known systems are limited to a particular subject matter, such as shareholder inquiries of a particular stock company, in order to focus the queries on more likely pre-stored key words.

Accordingly, there is a need for a system that does not rely on pre-stored key work matching and that can process the user query to gain an understanding of information or concepts requested, then searching preprocessed and knowledge bases of storing candidate concepts with links to databases of full documents in which such concepts appear. In addition, there is a need for such a system that can dynamically search all databases of stored documents on the World Wide Web for concept(s) in the user query, downloads candidate documents, processes them dynamically to determine if the downloaded document contains an answer to the query. If it does, then extracting the answer and presenting it to the user and adding the query, answer, and document link to the answer database.

SUMMARY OF EXEMPLARY EMBODIMENTS OF THE INVENTION

The present invention relates to a system to enable a user to ask a question (query) and for providing the user with one or more answers or solutions to such question. Since the system according to the principles of the present invention processes a query and generates answers employs the same methods regardless of the query format (X-A-O), (S-X-X), (S-X-O), or (S-A-X), where "X" is the absence of an element, and responds with answers in preferably (S-A-O) format, only the processing of query format (X-A-O) will be described in detail below but it will be understood that such processing applies to the other query formats as well.

The present system includes software for processing such query into, EG, Action-Object (A-O) format and includes a knowledge base or database into which a plurality of documents or other information have been or shall be semantically processed which knowledge base or database associates a plurality of solutions or subjects (S's) in association with specific A-O's as well as links for each A-O to the source document in which the A-O appears. The database can be server resident and in response to a user A-O query, transmits to the user some or all of the solutions stored in association with the specific A-O query. If no solutions (S's) reside in the database, the system searches the web for available web data, finds one or more entries (hereafter "documents") with relevant S-A-O, updates the database by storing the query A-O and particular S in association with the stored query A-O along with a link to the source document and transmits the answer (S) or answers ($S_1, S_2, \ldots$) to the user. Preferably, as seen in the word examples below, the answers are conveyed in S-A-O format for the user's convenience and reminding user of the query user submitted, particularly since the Web search may take a few minutes and the system calls the user back with an answer a described below.

In addition to user being able to use user's PC keyboard or mouse to initiate a query, a key feature of exemplary embodiments according to the principles of the present invention, enables user to use an ordinary telephone or cellular phone to access and query the system verbally and to receive an audio or visual display response containing the answer or solution.

An alternate feature of an alternate embodiment includes including in the user telephone or cellular phone a micro chip bearing software that converts voice to digital text, processes the query into A-O format, accesses the database server via the web, receives the solutions or answers from the web based server, converts it from text to synthesized voice or visual display data for user perception at users hand unit.

Other and further objects, benefits, and features shall become apparent with the following detailed description and drawings.

DETAILED DESCRIPTION OF EXEMPLARY EMBODIMENTS OF THE INVENTION

One example of a Semantic Answering System (SAS) according to the principles of the present invention includes voice-to-text transformation device or/and software system, client software module, a server storing the knowledge base or database of semantically created answers.

A user asks a question by voice, using microphone or telephone; the sound is transformed into text by software or special semantic chip, which is able to recognize the question. For example, the user asks, "How can I reduce cholesterol?" Text-to-voice device or software transforms sound into a text file as a query. One exemplary method of achieving this is disclosed in U.S. patent application Ser. No. 09/815,260 filed Mar. 22, 2001. The Client software module adds URL to the query; URL/query is sent over the World Wide Web to the Server, which contains the knowledge base of semantic index in Subject-Action-Object format.

Examples of Semantic Index

Assume the following are stored in the index:

| Dietary measure - reduce - cholesterol saturation; | | |
|---|---|---|
| ($S_1$) | (A) | (O) |
| Clofibrate - reduce - cholesterol. | | |
| ($S_2$) | (A) | (O) |

The server searches the database for (Ss) answers which match the query, EG, (A-O) and transmits them in HTML format over the Internet back to client software module, where A-O and answers ($S_1$ and $S_2$) are transformed into text files. Text files are transformed into voice by text-to-voice device or/and software system such as digital computer.

Alternately, if there is no answer in the database to the user query (A-O), semantic indexing engine processes the Web to find and retrieve relevant documents, then creates subject-action-object entries index and sends the index entries over the Internet.

Generally, the following signal transformations occur: (See FIG. 1)

Figure 1:
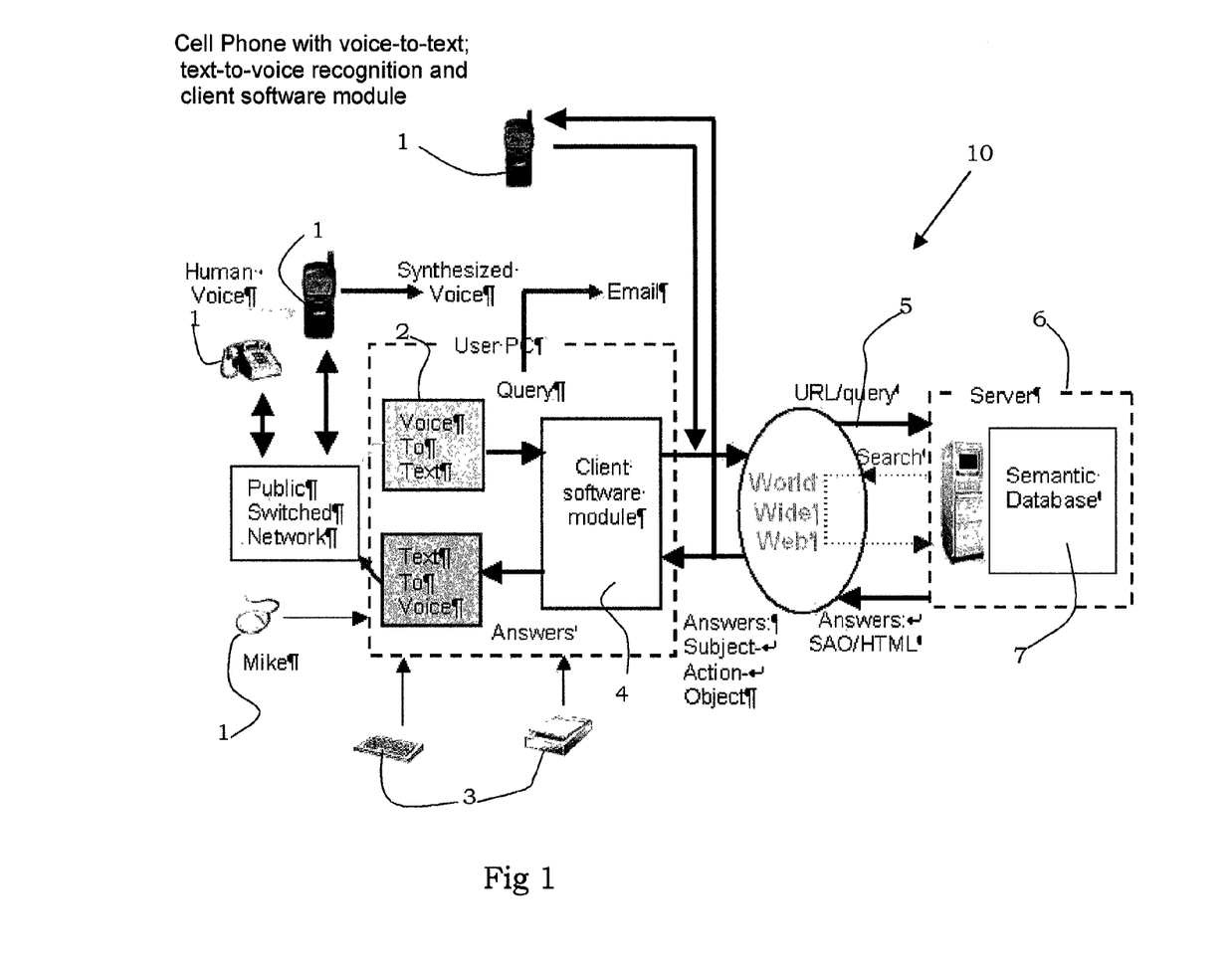
FIG. 1 is a schematic representation of a system according to the principles of the present invention.

User asks a question to a microphone 1.

The software or the hardware-level apparatus 2 converts the voice data stream into a plain text. Alternatively, user with the aid of keyboard, scanner, or other input device 3 may enter plain text. Problem statement is extracted from the plain text. The format of the problem statement is Action-Object (A-O). Client software 4 codes the Problem statement as parameter of the URL query.

URL Query 5 is sent over the World Wide Web to the Semantic Server.

The Semantic Server 6 searches for the available solutions in the semantic database. One example of a Semantic S-A-O processing method is disclosed in U.S. patent application Ser. No. 09/541,182 filed Apr. 3, 2000. If solutions (answers) exist, they are returned in HTML format. The representation of the solutions is basically Subject-Action-Object (S-A-O). If solution is not found in the Semantic Database 7, additional search on the WWW is performed. User will be later notified about the results. The search can be performed on a regular basis to accommodate the changes of the Internet.

The solutions are filtered by server 6 or the user PC or device and can be stored on the User PC. The links to the source documents can be stored in the Semantic database or client PC, as well. User can be notified by email that there are new solutions to his (her) problems in the Semantic Database.

Text-to-Voice module 1 generates the audio stream from the filtered solutions.

User listens to the answers in sequential order to the user's query.

On the whole, the SAS 10 delivers the answers to the user's questions. Answers can also be visually displayed or printed out as desired by user's PC.

Figure 2:
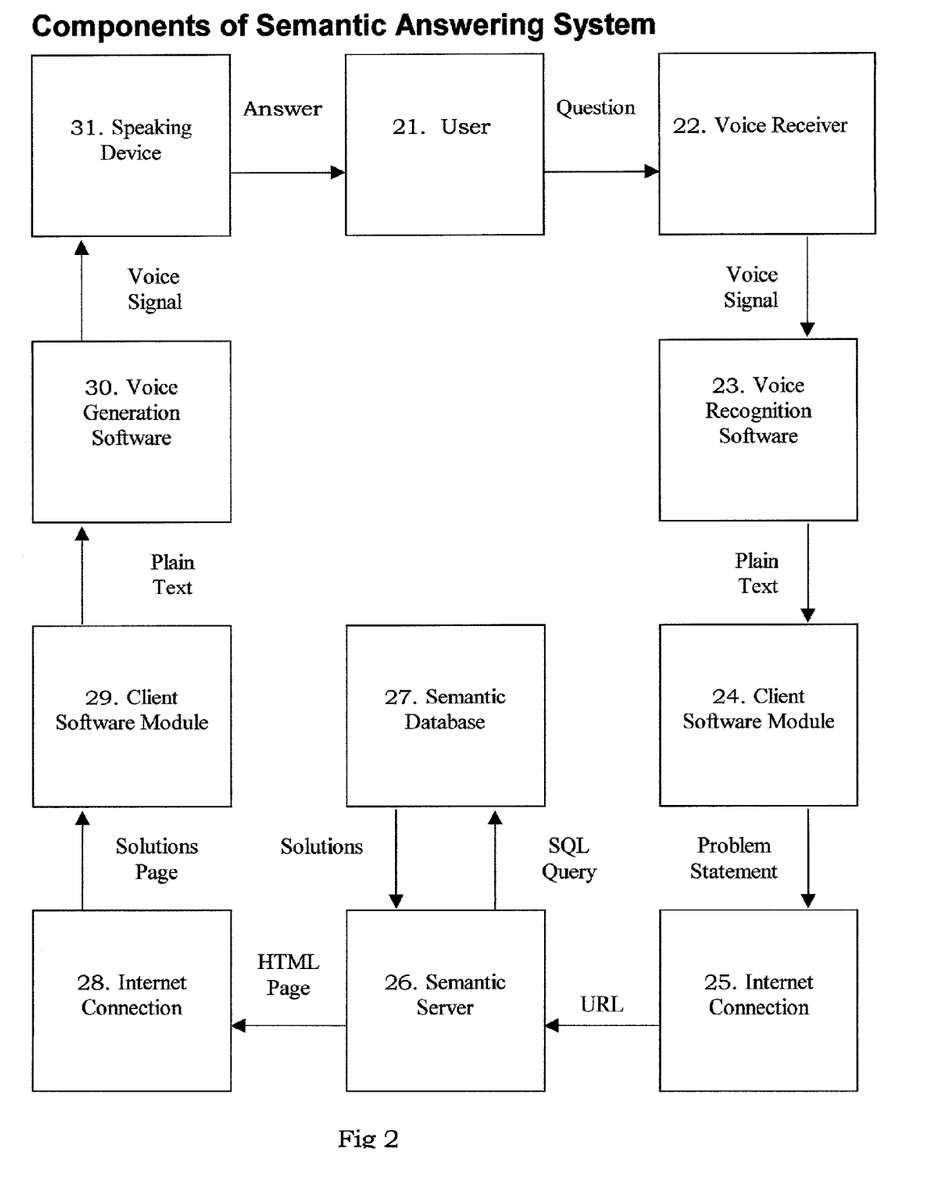
FIG. 2 is a block diagram of the principal steps and elements of the system of FIG. 1.

If the current database does not contain solutions to the user's problem, the Semantic Server performs a Web search. The results are converted to the Subject-Action-Object format. The components of the semantic database index are updated. The user may be notified about solution availability by, but not limited to, one of the following methods:
1. During the next interaction with SAS
2. Over the telephone
3. Over email
4. Over a pager The components of SAS are (The following numbers relate to the blocks of FIG. 2):

21. User. The user asks the questions and receives the answers to these questions.
    Output: Question containing a problem that is expressed in user voice, or as result of interaction with User PC through microphone, keyboard, scanner, etc.
22. Voice Receiver. VR converts the user voice to the electrical signals. Examples include headset microphone, telephone microphone, etc. The component includes also the sound card if it is used with the computer.
    Input: User voice
    Output: Voice stream
23. Voice Recognition Software. This software converts the signals coming from the Voice Receiver into plain text. Examples of Voice Recognition Software include, but not limited to ViaVoice™ software from IBM Corporation, or Dragon NaturallySpeaking from Dragon Systems.
    Input: Voice stream
    Output: Plain text that corresponds to the user's voice.
24. Client Software Module. Component 24 represents a module for generating queries to be sent over the Internet. The Module formulates a problem contained in the user's question. Format of the problem is Action-Object (A-O). This module also supports plain text input as an extra functionality.
    Input: Plain text
    Output: Problem statement in form Action-Object.
25. Internet Connection. Module 25 converts Action-Object problem statement into URL that is transmitted over one of the following connections, but not limited to Network Connection, Modem Connection, and Wireless Connection. The additional parameters of the URL may include use synonyms and constraints with the Semantic Server. See U.S. patent application Ser. No. 09/785,018 filed Feb. 16, 2001 and Ser. No. 09/814,698 filed Apr. 24, 2001.
    Input: Problem statement in form Action-Object.
    Output: URL.
26. Semantic Server/Semantic Database. Semantic server 26 intercepts the URL. Parameters of an URL define the algorithm of the server functioning. In a general case the semantic server generates SQL query understandable by Semantic Database. See for example: www.cobrain.com
    Input: URL.
    Output: SQL Query.
27. Semantic Database/Semantic Server. Semantic Database or Knowledge Base 27 stores the available solutions to the users' problems (A-O's). The database content is periodically updated. Content is optionally updated based in the users' requests. The solutions are stored in the form Subject-Action-Object. If Action-Object problem statement has similarity with at least one of the Subject-Action-Object solution, then it is retrieved from database 27. The maximal number of the solutions is indicated as one of the URL parameters. The results are presented as the recordsets. Semantic Server transforms these recordsets to the HTML pages.
    Input: SQL Query.
    Output: HTML page.

28. Internet Connection. Internet Connection 28 delivers the Web page containing solutions in HTML format to the Client computer or device resident Software Module which transforms the HTML format into plain text format.
Input: HTML page.
Output: Plain text.
29. Client Software Module. The module filters out the results. One of the following, but not limited to, set of filters may be applied: Subject length, specific terms (such as stop words "be" "is", etc.), number of solutions, etc. The results may be in Subject-Action-Object format, or may contain the source sentences. The following information can be stored at the User PC:
Result as Subject-Action-Object;
Sentence of the source document that contains this result;
[Hyper]link to the source document.
The filters that can be used for voice output are:
Subject or Object are too long
The total S-A-O length is too long
The user is notified if there are more results than allowed to be spoken.
Input: Plain text.
Output: Plain text.
As an alternative, this filtering function can be resident in the semantic server block 26 so that only filtered answer data are conveyed to the user's computer.
30. Voice Generation Software. The text of the answer passes through Voice Generation Software 30 (examples are ViaVoice software from IBM Corporation, or Dragon NaturallySpeaking from Dragon Systems).
Input: Plain text.
Output: Voice signal.
31. Speaking Device. Speaking Device 31 delivers the voice to the user by generating audio frequency waves. Examples include, but not limited, to telephone or cell phone speaker, computer speaker, or headset speaker. The component includes also the sound card if it is used with the computer.
Input: Voice signal.
Output: Audio signal.

EXAMPLES OF USER-SAS INTERACTION

Example 1

The solutions for the user problems are found in the Semantic Database.
Step No. 1 SAS:
"Hello, Dr. Smith!"
Step No. 2 User:
"How can I reduce cholesterol?"
Step No. 3 SAS:
"Reduce cholesterol?" (pause)
Step No. 4 SAS:
"Dietary measure-reduce-cholesterol saturation"
"Clofibrate-reduce-cholesterol"
"Saturation-reduce-serum cholesterol level"
"Talk with you later"
Step No. 5 User:
"Hello?"
Step No. 6 SAS:
"Yes, Dr. Smith!"
Step No. 7 <Going to step 2 user asks another question>

Example 2

The solutions for the user problems are not found in the Semantic Database.
Step No. 1 SAS:
"Hello, Dr. Smith!"
Step No. 2 User:
"How to cure West Nile encephalitis?"
Step No. 3 SAS:
"Cure West Nile encephalitis?" (pause)
Step No. 4 SAS:
"Currently there are no solutions of the problem "Cure West Nile encephalitis" in Semantic Database. Do you want to initiate the search over the Internet?"
Step No. 5 User:
"Yes"
Step No. 6 SAS:
"I will inform you when the solution becomes available. Talk with you later."
Step No. 7 SAS continues to search for solutions. The solutions for the user problem later appear available in the Semantic Database.
SAS calls to the user:
Step No. 8 SAS:
"Hello, Dr. Smith! 10 minutes ago you were interested in the problem "Cure West Nile encephalitis". Currently we have the following solutions:
a. X cures West Nile encephalitis.
b. Y cures West Nile encephalitis.
c. Z cures West Nile encephalitis."
As mentioned above, the SAS can handle different types of formatted queries. For example, each of the following would respond to user as above.
Different Types of Formatted Questions Example 3

(S-A-X) query format
Question: What does aspirin cause?
S-aspirin, A-cause
Answers:
a. Aspirin-cause-gastric damage
b. Aspirin-cause-stomach bleeding
c. Aspirin-cause-stomach irritation Example 4

(S-X-X) query format
Question: What does aspirin do?
S-aspirin
Answers:
a. Aspirin-reduce-headache
b. Aspirin-prevent-pregnancy loss
c. Aspirin-reduce-risk of cataract development Example 5

(S-X-O) query format
Question: What are the relations between aspirin and asthma?
S-aspirin, O-asthma
Answers:
a. Aspirin-induce-asthma
b. Aspirin-trigger-asthma attack

Alternate Embodiment

Figure 3:
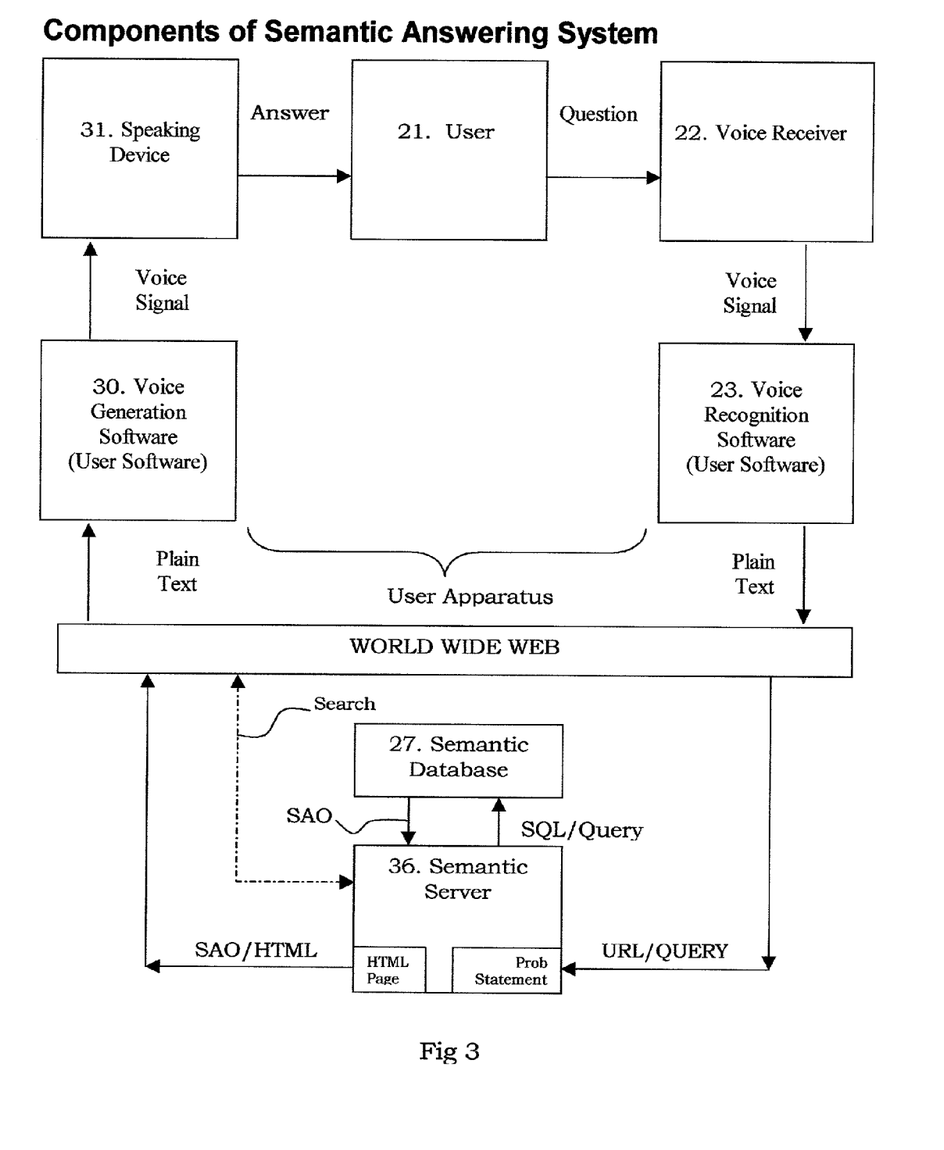
FIG. 3 is similar to FIG. 2 showing an alternate embodiment of the present invention.

An alternate embodiment is shown in FIG. 3 in which user PC or device transmits the query in plain text. The query is processed and the problem statement generated in server 36 and the SAO, whether stored in database 27 or acquired from the World Wide Web and stored in database 27, is transmitted HTML page by server 36. The remainder of the system functions as mentioned above with this arrangement, all semantic software and problem-solution statements processing is located at the server instead of each users apparatus.

Possible Applications

Semantic chip for mobile and other devices.
This chip delivers the following functionality:
Speech to Text Conversion
Problem Statement based on the semantic algorithms
Transmission of the problem through the web to the Semantic Server
Receiving of the solution from the Semantic Server through the web
Solutions filtering
Text to Speech conversion This corresponds to the FIG. 2 components 23, 24, 25, 28, 29, and 30 preferably in one chip as the users terminal or cell phone. Alternately, filtering can be done at the Semantic Server instead of the user's PC or chip.

Self-Growing Semantic Networks

Whenever each user asks the SAS a new question or new solutions to old questions appear in the Semantic Server, the server adds them to the Semantic database. As Semantic Database grows and stores more and more content S-A-O's, the probability of the available solution increases over time.

Semantic Updating or News Networks

Example 3

Original user is interested in the specific problem A-O. After initially serving the original user, the Semantic Server continues to track the appearance of any new S-A-O solutions that did not exist in the database before the original user was served. This updating happens either on a regular basis or during processing the relevant A-O queries of other users. The original user is automatically informed that the new solution is available.

For details of suitable semantic processing systems and the S-A-O format, see U.S. patent application Ser. Nos. 09/321,804, filed May 27, 1999 and 09/541,182, filed Apr. 3, 2000, and the Knowledgist® Software and COBRAIN® Software marketed by Invention Machine Corporation of Boston, Mass. and used to support Invention Machine's website www.cobrain.com. See also U.S. patent application Ser. No. 09/815,260, filed Mar. 22, 2001 for further SAO processing, query recognition, and expanded SAO query search capabilities.

Various improvements and modifications can be made to the herein disclosed exemplary embodiments without departing from the scope of the present invention.

We claim:

1. A semantic answering system that returns natural language answers in an S-A-O (subject-action-object) format in response to a natural language question, wherein the S-A-O format represents semantic relationships between the S, A, and O elements, the system comprising:
 a problem statement generator that processes the natural language question to extract a problem statement in a format X-A-O, S-A-X, S-X-O, or S-X-X, wherein S, A, and O are semantic elements in the natural language question, X indicates absence of an S, A, or O;
 a knowledge base comprising an answer database including a set of answer S-A-Os and, for each answer S-A-O, a link to a source document;
 a semantic server configured to perform a non-keyword query of the knowledge base using the semantic elements and semantic relationships from the problem statement to find at least one answer S-A-O, wherein the at least one answer S-A-O includes the A and O, S and A, S and O, or S from the problem statement and an S, A, or O to replace each X in the problem statement, thereby completing the S-A-O format; and
 a communication device configured to output the at least one answer S-A-O to a computer.

2. A system as set forth in claim 1, wherein said server is configured to conduct a search of the World Wide Web, identify documents that include new answer S-A-O's each comprising query elements in the problem statement, store links to such documents, and add such new answer S-A-O's to the knowledge base.

3. A system as set forth in claim 1, wherein the user apparatus converts human voice signals into said problem statement.

4. A system as set forth in claim 1, wherein the user apparatus converts the at least one answer S-A-O into audio signals.

5. A system as set forth in claim 1, wherein said user apparatus includes voice-to-text and text-to-voice recognition capability and a client software module including the problem statement generator.

6. A system as set forth in claim 1, wherein said user apparatus includes a user digital computer for generating said problem statement and receiving said at least one answer S-A-O.

7. A system as set forth in claim 6, wherein said user apparatus further includes at least one user input device that includes a human voice to signal converter or a keyboard.

8. A system as set forth in claim 6, wherein said user apparatus further includes at least one user input device that includes a signal to audio converter or a visual display monitor.

9. A system as set forth in claim 1, wherein each of the at least one answer S-A-Os is represented in a sentence format.

10. In a digital computing system, a semantic answering method that returns natural language answers in an S-A-O (subject-action-object) format in response to a natural language question, wherein the S-A-O format represents semantic relationships between the S, A, and O elements, the method comprising:
 processing the natural language question to extract a problem statement in a format X-A-O, S-A-X, S-X-O, or S-X-X, wherein S, A, and O are semantic elements in the natural language question, X indicates absence of an S, A, or O;
 providing a knowledge base comprising an answer database including a set of answer S-A-Os and, for each answer S-A-O, a link to a source document;
 performing a non-keyword query of the knowledge base using the semantic elements and semantic relationships from the problem statement to find at least one answer S-A-O, wherein the at least one answer S-A-O includes the A and O, S and A, S and O, or S from the problem statement and an S, A, or O to replace each X in the problem statement, thereby completing the S-A-O format; and
 outputting the at least one answer S-A-O to a computer.

11. A method as set forth in claim 10, further comprising searching the World Wide Web, identifying documents that include new answer S-A-O's each comprising query elements in the problem statement, storing links to such documents, and adding such new answer S-A-O's to the knowledge base.

12. A method as set forth in claim 10, further comprising converting human voice signals into said problem statement.

13. A method as set forth in claim 10, further comprising converting the at least one answer S-A-O into audio signals or visual display.

14. A method as set forth in claim 13, wherein generating the audio signals or visual display includes converting text-to-audio or voice-to-text.

15. A method as set forth in claim 10, wherein generating the problem statement includes converting voice-to-text.

16. A system enabling a user to ask a question (query) and for providing the user with one or more answers or in the form of solutions to such question, the system comprising:
   a knowledge base comprising a set of answers having the form S-A-O (subject-action-object), and further comprising links to documents corresponding to the set of answers;
   a problem statement generator configured to receive a natural language query from a user apparatus and to automatically generate a problem statement as a query in the form A-O, S-A, S-X-O or S, where S, A and O are query elements in the natural language query, where X indicates absence of a query element;
   a server coupled to the knowledge base, the server configured to search the knowledge base using the problem statement to find at least one S-A-O answer, wherein the A and O, or S and A, or S and O or S query elements in the problem statement are also in the at least one S-A-O answer, wherein the at least one S-A-O answer includes a statement extracted from a document that provides a solution solicited by the natural language question; and
   a communication device configured to transmit the at least one answer S-A-O and associated active document links to the user apparatus,
   wherein said server is configured to conduct a search of the World Wide Web, identify documents that include new answer S-A-O's each comprising query elements in the problem statement, store links to such documents, and add such new answer S-A-O's to the knowledge base, and
   wherein said server is also configured to conduct said search of the World Wide Web automatically in response to the server determining that no answer S-A-Os exist in the knowledge base comprising the query elements in the problem statement.

17. A system enabling a user to ask a question (query) and for providing the user with one or more answers or in the form of solutions to such question, the system comprising:
   a knowledge base comprising a set of answers having the form S-A-O (subject-action-object), and further comprising links to documents corresponding to the set of answers;
   a problem statement generator configured to receive a natural language query from a user apparatus and to automatically generate a problem statement as a query in the form A-O, S-A, S-X-O or S, where S, A and O are query elements in the natural language query, where X indicates absence of a query element;
   a server coupled to the knowledge base, the server configured to search the knowledge base using the problem statement to find at least one S-A-O answer, wherein the A and O, or S and A, or S and O or S query elements in the problem statement are also in the at least one S-A-O answer, wherein the at least one S-A-O answer includes a statement extracted from a document that provides a solution solicited by the natural language question; and
   a communication device configured to transmit the at least one answer S-A-O and associated active document links to the user apparatus, wherein said server is configured to conduct a search of the World Wide Web, identify documents that include new answer S-A-O's each comprising query elements in the problem statement, store links to such documents, and add such new answer S-A-O's to the knowledge base, and
   wherein said server is programmed to prompt the user for a command to initiate the search of the World Wide Web.

18. In a digital computing system, a method enabling a user to input a question (query) and providing the user with one or more answers or solutions to such query, the method comprising:
   receiving a natural language user query that includes one or more query elements in the form of A-O, S-A, S-X-O, or S, where X indicates absence of a query element;
   providing a knowledge base of semantically and automatically processed information including a set of answers in the form of S-A-O's (subject-action-object), and further comprising active links to documents corresponding to the set of answers;
   automatically generating a problem statement in the form A-O, S-A, S-X-O or S from the natural language query, where S, A and O are query elements in the natural language query;
   using the problem statement, identifying in the knowledge base at least one answer S-A-O, wherein the A and O, or S and A, or S and O, or S query elements in the problem statement are also in the at least one S-A-O answer;
   transmitting signals representative of the at least one answer S-A-O to the user apparatus; and
   searching the World Wide Web, identifying documents that include new answer S-A-O's each comprising query elements in the problem statement, storing links to such documents, and adding such new answer S-A-O's to the knowledge base, including initiating said searching automatically in response to determining that no answer S-A-Os exist in the knowledge base that include the query elements in the problem statement.

19. In a digital computing system, a method enabling a user to input a question (query) and providing the user with one or more answers or solutions to such query, the method comprising:
   receiving a natural language user query that includes one or more query elements in the form of A-O, S-A, S-X-O, or S, where X indicates absence of a query element;
   providing a knowledge base of semantically and automatically processed information including a set of answers in the form of S-A-O's (subject-action-object), and further comprising active links to documents corresponding to the set of answers;
   automatically generating a problem statement in the form A-O, S-A, S-X-O or S from the natural language query, where S, A and O are query elements in the natural language query;
   using the problem statement, identifying in the knowledge base at least one answer S-A-O, wherein the A and O, or S and A, or S and O, or S query elements in the problem statement are also in the at least one S-A-O answer;
   transmitting signals representative of the at least one answer S-A-O to the user apparatus; and searching the World Wide Web, identifying documents that include new answer S-A-O's each comprising query elements in the problem statement, storing links to such documents, and adding such new answer S-A-O's to the knowledge base, including prompting the user for a command to initiate the searching of the World Wide Web.

20. A method of providing one or more solutions in response to a user query, the method comprising:

providing a knowledge base of semantically and automatically processed information including a set of answers in an S-A-O (subject-action-object) format, and further comprising active links to documents corresponding to the set of answers;

processing a natural language user query at a user device, including generating a problem statement in the form A-O, S-A, S-X-O or S from the natural language user query, where S, A and O are query elements in the natural language query and X indicates absence of a query element, converting the problem statement into a URL query, and sending the URL query to a semantic server having access to the knowledge base;

generating a non-keyword knowledge base query from the URL query at the semantic server and searching the knowledge base using the semantic elements and semantic relationships from the problem statement to find one or more answer S-A-O, wherein the one or more answer S-A-O includes the A and O, S and A, S and O, or S from the problem statement and an S, A, or O to replace each X in the problem statement, thereby completing the S-A-O format;

and if the one or more answer S-A-O is found, converting the one or more answer S-A-O into at least one HTML page and sending the at least one HTML page to the user device; and processing the at least one HTML page at the user device to output the one or more answer S-A-O to the user query.

* * * * *